March 12, 1929. C. J. IRWIN 1,704,833
HOB GRINDER
Filed May 3, 1923 5 Sheets-Sheet 1
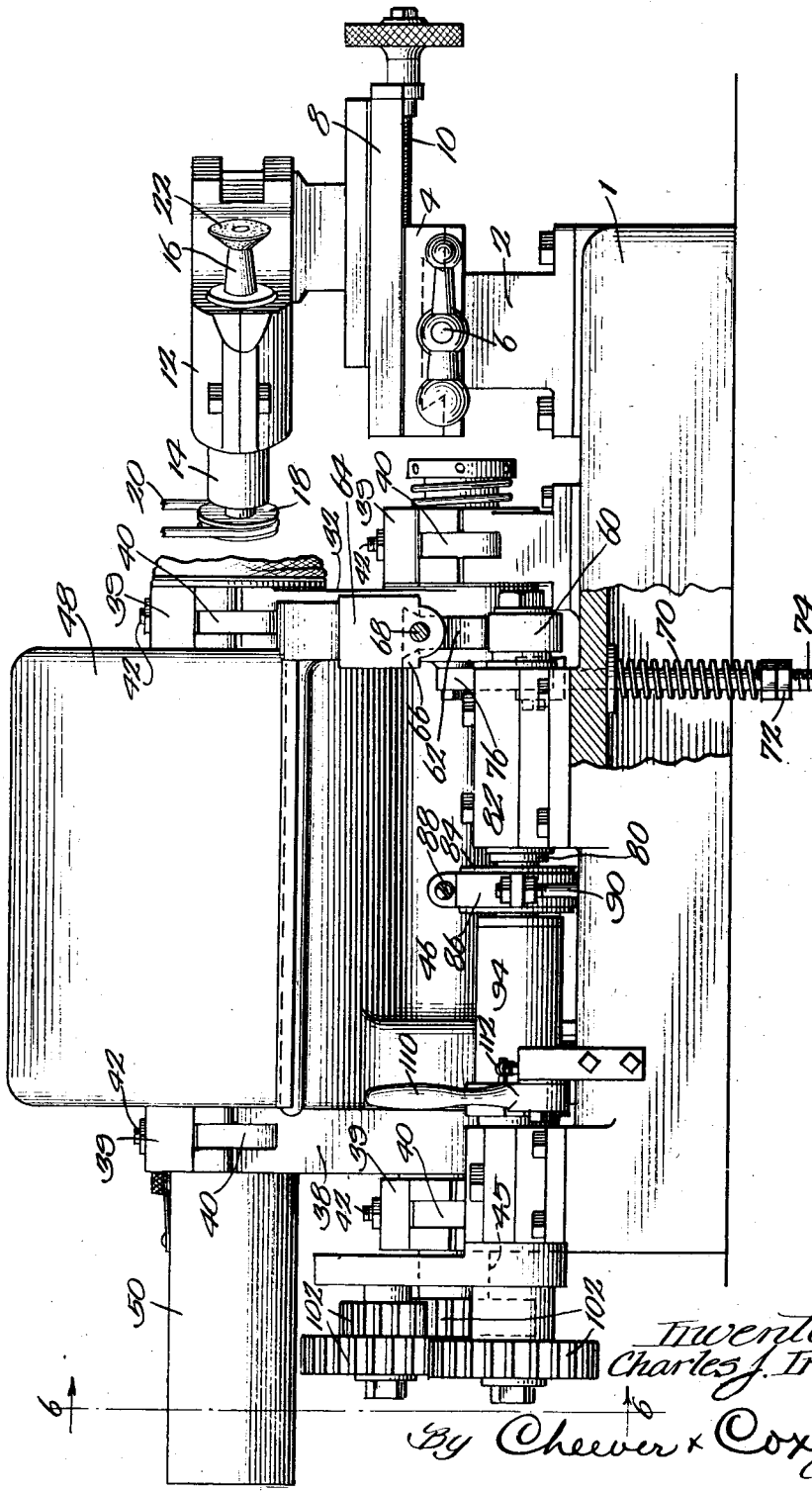

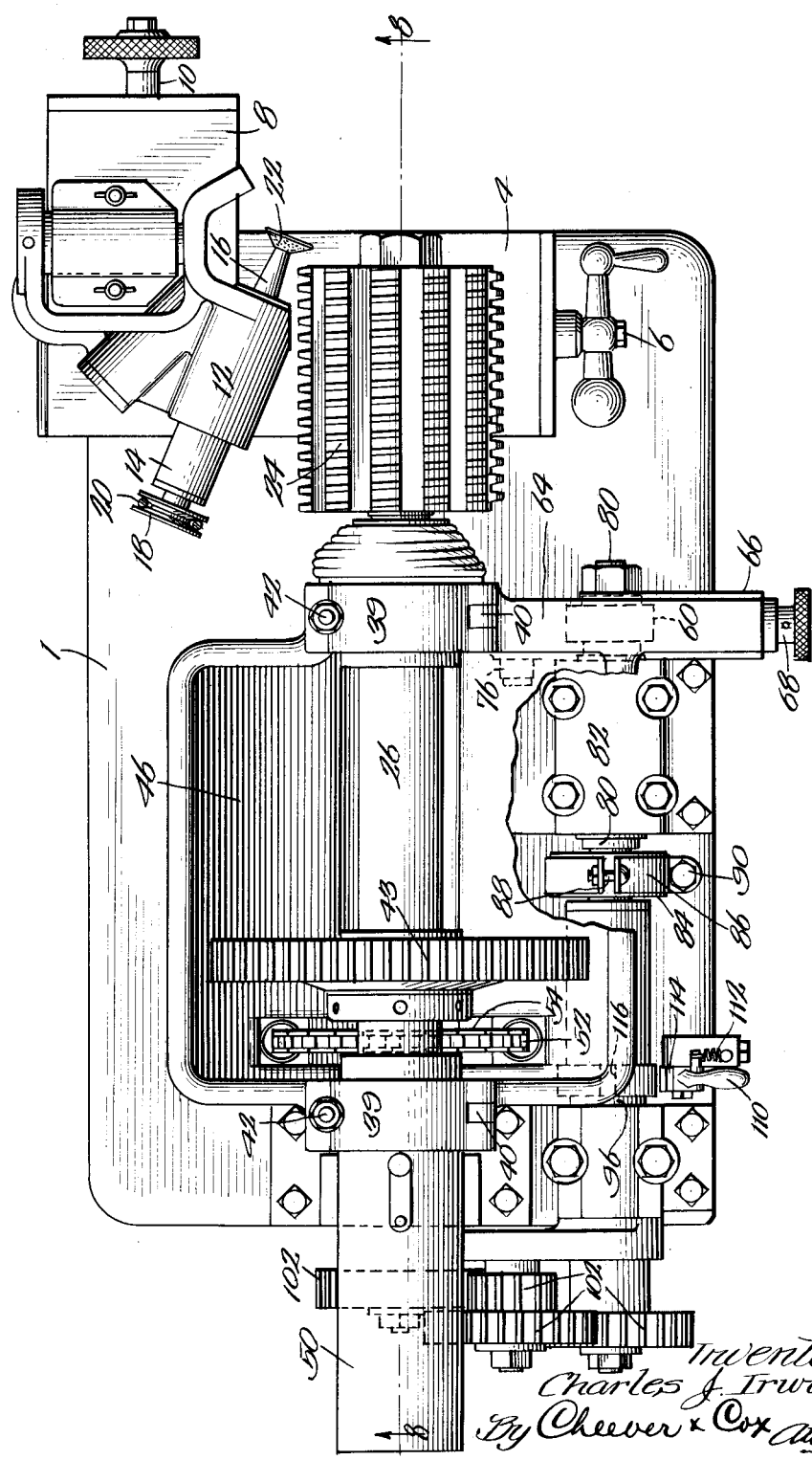

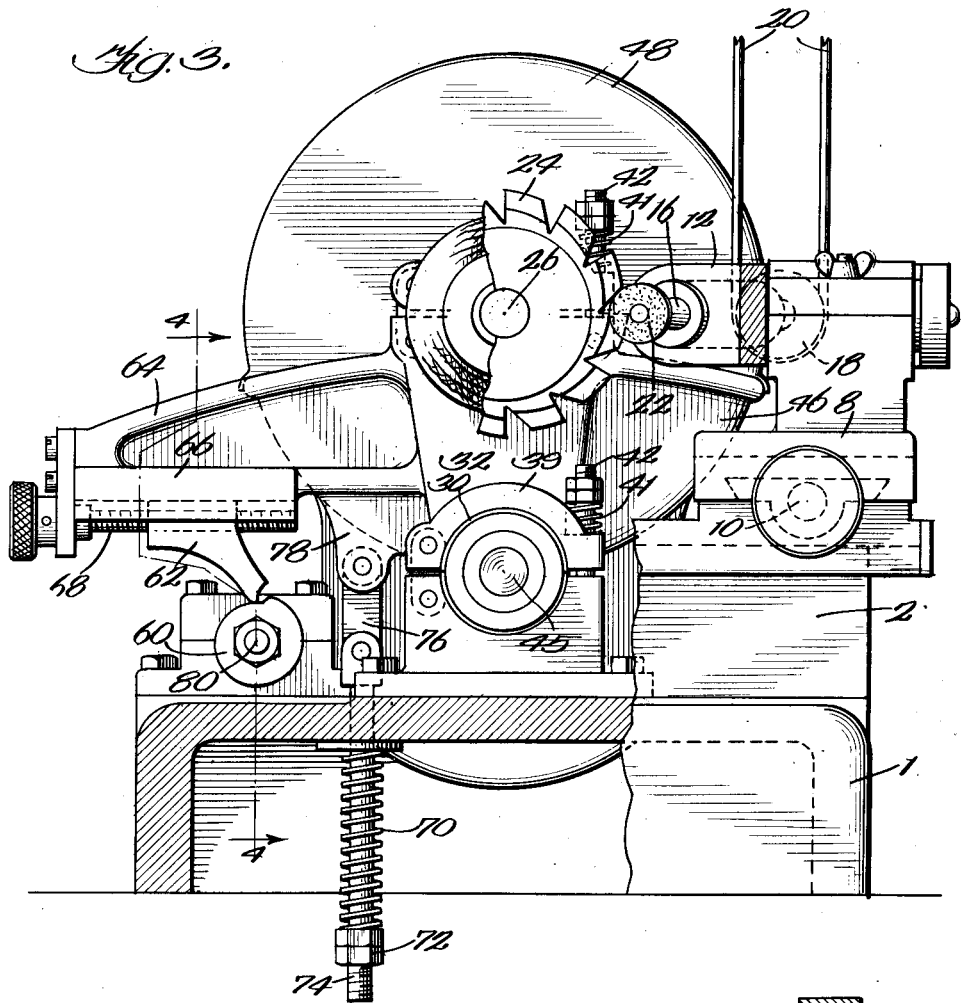
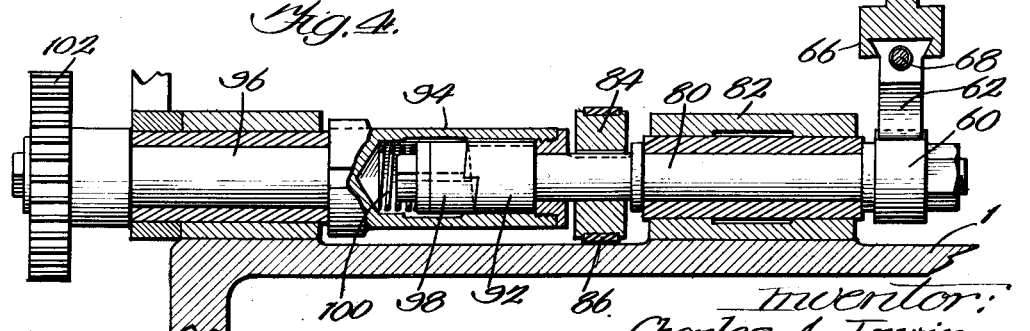

March 12, 1929.　　C. J. IRWIN　　1,704,833
HOB GRINDER
Filed May 3, 1923　　5 Sheets-Sheet 4
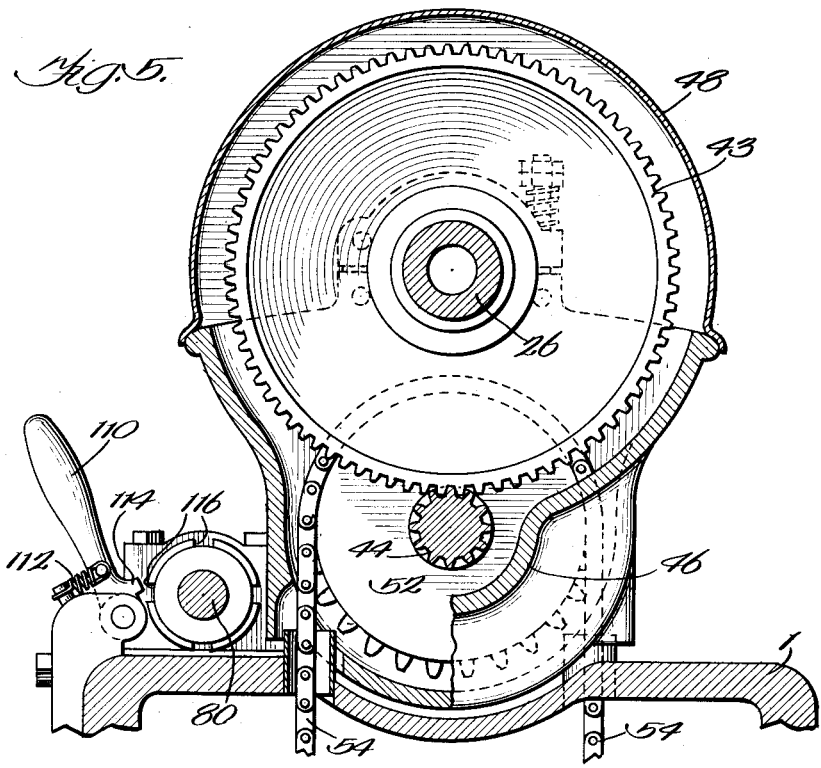
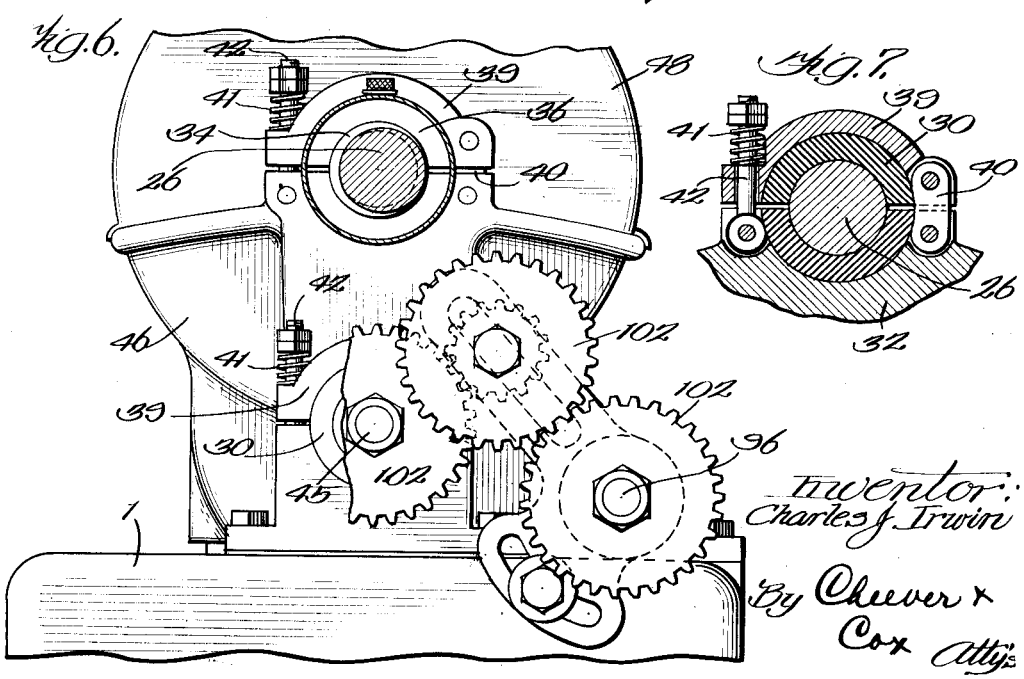
Inventor:
Charles J. Irwin
By Cheever &
Cox Atty's

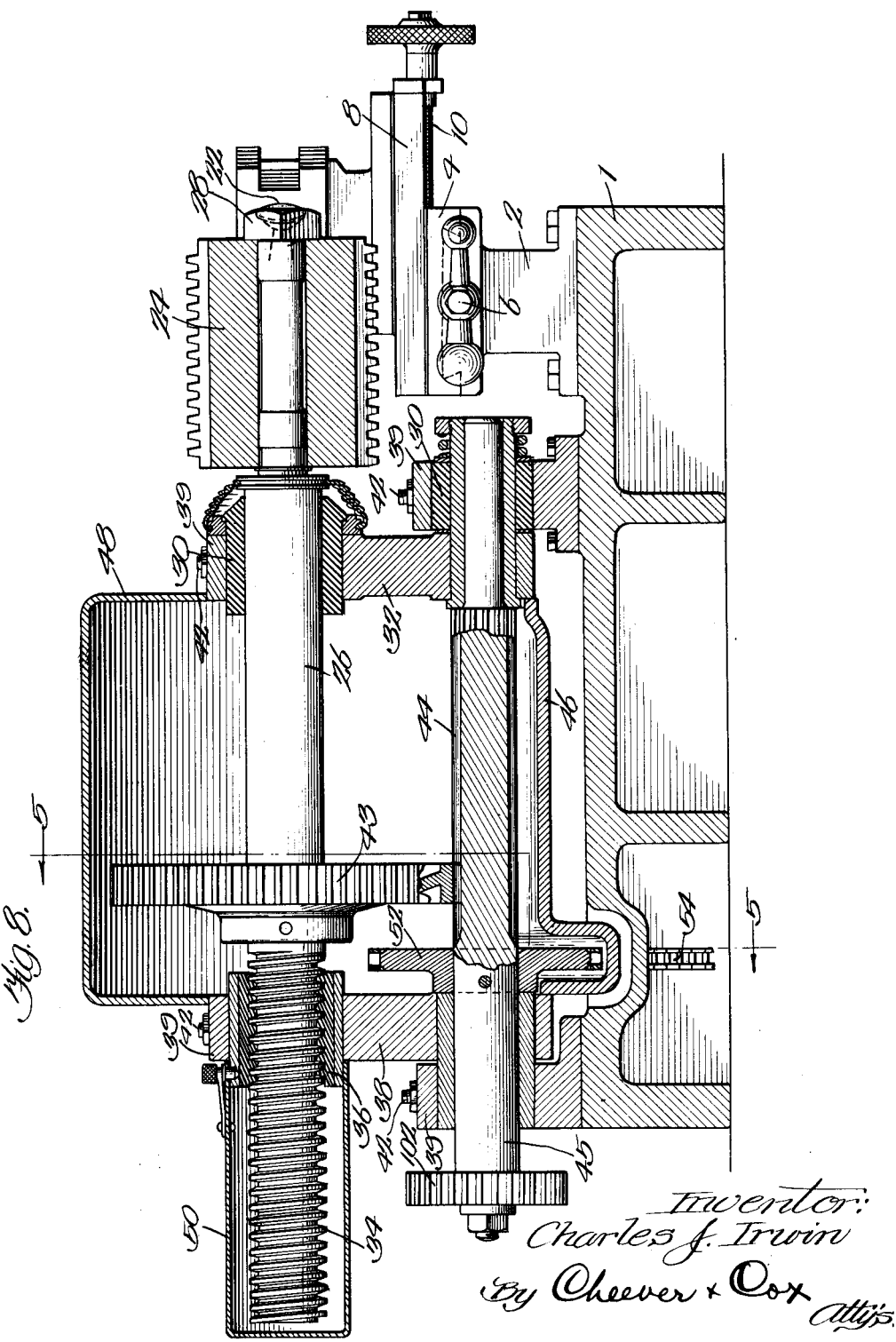

Patented Mar. 12, 1929.

1,704,833

UNITED STATES PATENT OFFICE.

CHARLES J. IRWIN, OF CHICAGO, ILLINOIS, ASSIGNOR TO ILLINOIS TOOL WORKS, OF CHICAGO, ILLINOIS, A CORPORATION OF ILLINOIS.

HOB GRINDER.

Application filed May 3, 1923. Serial No. 636,323.

My invention relates to hob grinders and in some respects may be regarded as an improvement over the machine shown in Olson and England Patent 1,383,843. In my machine there is a rotary grinder which normally occupies a fixed position and a combined work spindle and lead screw which supports and rotates the work and at the same time feeds it axially. In my present machine the work spindle is mounted in a frame which oscillates so as to bring the work toward and from the grinder in the manner of a backing-off machine. The oscillating or rocking frame is oscillated by means of a cam and the axis of oscillation is concentric with a driving pinion. The pinion is widefaced so that the gear which meshes with it and is fastened to the work spindle may travel axially without becoming disengaged from the pinion. The machine in addition to these general characteristics possesses a number of mechanical expedients tending to simplify the machine and render its operation smooth and accurate. These characteristics will be described in detail as the specification proceeds.

To set out the objects more particularly: One of the objects of the invention is to simplify the work spindle and means by which it is rotated and fed axially. In the Olson and England machine above mentioned the work spindle and lead screw are separate pieces splined together. One of my present objects is to make it possible to construct the work spindle and lead screw in a single piece. Another object of my invention is to drive the work spindle through a gear mounted on a work spindle as in the previous machine but driven by a wide-faced pinion which permits the gear to travel axially in unison with the work spindle and lead screw. Another object of the invention is to reduce the number of bearings required. According to my design the combined work spindle and lead screw are supported in but two bearings, one of which is an ordinary bearing and the other is threaded to cause the lead screw to travel. Another object of my invention is to provide special means for adjusting the throw of the cam which oscillates the rocking frame. A further object is to provide a type of bearing which will always compensate for wear. In this bearing the cap is spring-pressed onto the shaft and therefore always holds the shaft firmly seated in the bearing. Another object is to provide means for preventing overthrow of the cam which oscillates the rocking frame.

I accomplish my objects by the mechanism illustrated in the accompanying drawings, in which Figure 1 is a front elevation of the complete machine, certain parts being broken away to reveal the internal construction.

Figure 2 is a top plan view with the upper portion of the gear housing removed and portions broken away to show certain features of construction.

Figure 3 is an end elevation partly in section.

Figure 4 is a vertical section on the line 4—4, Figure 3.

Figure 5 is a sectional elevation on the line 5—5, Fig. 8.

Figure 6 is a sectional elevation on the line 6—6, Fig. 1.

Figure 7 is a sectional elevation showing the spring pressed bearing cap for taking up wear.

Figure 8 is a sectional elevation of the machine taken on the line 8—8, Figure 2.

Like numerals refer to like parts throughout the several views.

According to the illustrated design the machine has a bed frame 1. A pedestal 2 is mounted upon this frame and supports a cross carriage 4, the position whereof is controlled by a feed screw 6. This carriage supports a platform 8 which is slidable lengthwise of the machine and is controlled by an adjusting screw 10. Mounted on platform 8 is a holder 12 for supporting the housing 14 of the grinder spindle 16. The spindle is driven at high speed by a sheave 18 and belt 20 or other suitable driving means. A grinder 22 of any suitable type is secured to spindle 16 and is rotated by it. This grinder occupies a fixed position in the machine during a single pass of the work, and after the pass is completed and the work returned to initial position, is fed radially toward the axis of the work by operating the feed screw 6.

Now referring to the work supporting and operating means: The work 24, which in the present case is a hob, is rigidly fastened to the shouldered work spindle 26 by means of a nut 28 or otherwise. The spindle bears in a split bushing 30 of babbitt or other metal carried in a rocking frame member 32. A lead screw 34 is integral with the work spindle and bears in a split bushing 36 which is of babbitt or other metal, and is internally threaded to form a nut in which the lead screw works. This nut is mounted in a second rocking frame member 38. The work spindle is held firmly seated in its bearings by spring pressed caps 39 shown in side elevation in Figure 7. The threads have sloping sides as shown in Figure 8. At one side the caps are connected to the bearings by links 40 and at the other side are subject to the pressure of springs 41 which are retained by links 42 pivoted to the bearings. The result is that as the bearings wear the caps keep the parts in close contact, thus preventing displacement of the spindle and enabling the machine to do accurate work. Rigidly fastened to the spindle is a gear 43 sometimes called a bull gear. This drives the work spindle and travels axially with it. It meshes with a pinion 44 formed upon a shaft 45 mounted in the machine below the work spindle. This pinion shaft is mounted in suitable stationary bearings on the bed frame 1 and forms an axis of oscillation for the rocking frame which includes the members 32 and 38 previously mentioned together with a lower half-housing 46 and an upper half-housing 48. Housing 48 encloses the bull gear 43 and is axially extended so as to permit of the travel of the latter. A supplemental housing 50 encloses the projecting end of lead screw 34.

The pinion 44 has a face wide enough to permit the bull gear to remain in mesh with it throughout the axial travel of said bull gear. The pinion shaft is driven by a sprocket wheel 52 which is fastened to it and driven by a chain 54 from a suitable power device beneath. This driving mechanism operates very smoothly and is free from vibration.

The rocking frame, which moves the work towards and from the grinder, is oscillated by means of a cam 60 which engages a rider 62 mounted on the under side of an arm 64 which projects forward from and is a part of the rocking frame. It is shown in side elevation in Figure 3. According to the particular design shown the rider 62 slides in guides 66 on arm 64 and is adjusted in said guides by means of a screw 68 mounted in the arm and working in the internally threaded rider. It will be evident that by changing the distance of the rider 62 from the axis of oscillation of the rocking frame (pinion shaft 45) the arc of oscillation will be correspondingly increased or decreased.

The rider is held in contact with the cam by means of a spring 70 best shown in Figures 1 and 3. This is a compression spring and bears against the under side of the bed frame 1. At the lower end it engages nuts 72 on a tension rod 74 which is connected at the upper end by a link 76 to a lug 78 formed on the bottom of the arm 64.

The cam 60 is rotated by a cam shaft 80 shown in side elevation in Figure 4. It is mounted in a bearing 82 and has fastened to it a brake hub 84 encircled by a brake band 86 to prevent overthrow. The degree of friction of this brake band is regulated by adjusting screw 88 shown, for example, in Figures 1 and 2. The brake band is held against rotation by an anchor rod 90.

The cam shaft is driven by a one-way clutch shown in Figure 4. This includes a sleeve 92 which is loose upon shaft 80 and is splined to the inner side of a hollow cylinder 94, rigidly connected to a transmission shaft 96. Sleeve 92 has ratchet teeth cooperating with a similarly toothed sleeve 98, splined to shaft 80. Sleeve 98 is yieldably held in engagement by a spring 100 located within said hollow cylinder 94. The result is that when shaft 96 is rotated in one direction it will rotate cam 60 and when rotated in the opposite direction will "click"—that is, the sleeve 98 will be forced out of operating engagement with the sleeve 92.

Shaft 96 is driven from the pinion shaft 45 through the agency of change speed gears 102, shown for example in Figures 1 and 6. In order that the cam shaft may be rigidly locked against rotation for any purpose—for instance, for the proper adjusting of cam 60 upon it, a lever 110 is provided as shown in Figure 5 and elsewhere. This lever is fulcrumed on the machine frame and is normally held out of engagement by a spring 112. It has a nose 114 adapted to enter various notches in a collar 116 rigidly fastened to the cam shaft.

In operation, when the machine has been assembled and adjusted as illustrated in the drawings, the grinder 22 is rotated at high speed by the belt 20. The chains 54 or other power device rotates the pinion shaft 45 which performs the dual function of rotating the cam shaft 80 and bull gear 43. The latter rotates the work spindle 26 and lead screw 34. This imparts to the work (the hob 24) a motion both of rotation and axial travel while the cam 60 causes the rocking frame to oscillate about its axis 45 and move the hob toward and from the grinder after the manner of a backing-off machine. Thus the hob has three kinds of movement—one, toward and from the grinder in accordance with the relief in the hob teeth—one of rotation to present the successive hob teeth to the grinder, and one of axial movement in accordance with the lead of the teeth in the hob. I have here illustrated a hob having 12 teeth in a circumference, and it is necessary, of course, to select the proper change speed gears to cause the cam 60 to rotate 12 times as fast as the work spindle. The lead screw 34 also will be selected so that its pitch will correspond to the pitch or lead of the teeth in the hob. Under these conditions the hob teeth will be ground to proper form automatically and with great accuracy. One thing that makes for accuracy is the fact that the work spindle and lead screw are of a single piece. This reduces lost motion to a minimum—in fact it abolishes lost motion as between a spindle and a screw. Another thing which makes for accuracy is the fact that the drive shaft 44 is geared directly to the work spindle, the drive shaft itself constituting a wide-faced pinion which meshes directly with the bull-gear on the work spindle and permits said gear to travel along the pinion in unison with the axial travel of the work. The spring pressed caps 39 also promote accuracy for they hold the work spindle snugly in its bearings and constantly take up the wear. Another thing which promotes accuracy is the brake 86 which at all times holds the clutch sleeves 92, 98 in close engagement so long as the driving member is rotating in the forward direction.

Having thus described my invention what I claim as new and desire to secure by Letters Patent is:—

1. A hob grinder having a grinder, a hub spindle which is rotatable and axially movable, a gear wheel fastened to the hob spindle and traveling therewith, a wide-face pinion meshing with said gear for rotating it, a lead screw integral with the hob spindle for moving it axially, two bearings, one for the hob spindle and the other for the lead screw, and means for rocking said bearings to move the hob toward and from the grinder in accordance with the relief on the hob teeth.

2. A hob grinder having a grinder, a hob spindle which is rotatable and axially movable, a gear wheel fastened to the hob spindle and traveling therewith, a wide-face pinion meshing with said gear for rotating it, a lead screw integral with the hob spindle for moving it axially, two bearings, one for the hob spindle and the other for the lead screw, and means for rocking said bearings to move the hob toward and from the grinder in accordance with the relief on the hob teeth, said bearings being coaxial with said wide-face pinion and being laterally fixed and the hob spindle being axially slidable in them.

3. A hob grinder having a grinder, a hob spindle, a gear fastened directly on said spindle for rotating it, a pinion for rotating said gear, a driving wheel coaxial with said pinion for driving it, a laterally fixed rocking frame for supporting the hob spindle, said rocking frame being coaxial with said pinion, and means for moving said hob spindle axially in its bearings in accordance with the lead of the hob teeth.

4. A hob grinder having a grinder, a hub spindle, a gear fastened directly on said spindle for rotating it, a wide face, non-traveling pinion for rotating said gear, a driving wheel coaxial with said pinion for driving it, a non-traveling rocking frame for supporting the hob spindle, said rocking frame being coaxial with said pinion and the hob spindle being slidable axially in said rocking frame, and a lead screw integral with said hob spindle for moving it axially.

5. A machine for grinding hobs having a grinder, a hob spindle, means for rotating the spindle and moving it axially, a rocking frame in which the hob spindle is journaled, a cam for rocking said frame, and a cam shaft for rotating the cam, said shaft having a one way clutch for rotating it, and a brake for preventing overthrow.

6. A machine for grinding hobs having a grinder adapted to rotate in place, a longitudinally traveling spindle for supporting the hob, a gear wheel fastened directly to and concentric with the hob spindle, a pinion for driving the gear, a fulcrum shaft coaxial with said pinion and integral therewith, a gear wheel fastened to said shaft for driving it, a lead screw integral with said hob spindle for moving it longitudinally, a non-traveling rocking frame having bearings, one for the hob spindle and the other for the lead screw, the last mentioned bearing being in the form of a nut, and a cam geared to said shaft for oscillating said rocking frame and moving the hob toward and from the grinder in accordance with the relief in the hob teeth.

7. A machine for grinding hobs having a grinder adapted to rotate in place, a spindle for supporting the hob, a gear wheel fastened to and concentric with the hob spindle, a pinion for driving the gear, a fulcrum shaft coaxial with said pinion and integral therewith, a gear wheel fastened to said shaft for driving it, a lead screw integral with said hob spindle for moving it longitudinally, a rocking frame having bearings, one for the hob spindle and the other for the lead screw, the last mentioned bearing being in the form of a nut, and a cam geared to said shaft for oscillating said rocking frame and moving the hob toward and from the grinder in accordance with the relief in the hob teeth, said rocking frame being pivoted upon said shaft and the pinion having a wide face whereby the gear wheel may remain in mesh with it during its axial travel.

8. A hob grinder having a grinder, a spindle, one portion of which is adapted to support the hob and another portion has a thread corresponding to the lead of the hob, a gear rigidly secured to the spindle for rotating it and traveling with it, a wide faced pinion for rotating the gear, a nut in which the threaded portion of the spindle works, a non-traveling carriage in which the spindle is journaled whereby axial movement is confined to the spindle and gear wheel, said nut being mounted in the carriage, and means for producing relative bodily movement between the spindle and the grinder to produce relief in the hob teeth.

9. A hob grinder having a grinder rotating in place, a spindle supporting the work at one portion and having at another portion a lead screw, a non-traveling nut cooperating with the lead screw to support the spindle and advance it axially in accordance with the lead of the hob, a non-traveling bearing in which said spindle rotates, a non-traveling rocking frame for moving the hob toward and from the grinder to produce relief in the work, and two gears for rotating the spindle, one of said gears being rigidly fastened to it and the other meshing with the first mentioned gear and being concentric with the axis of oscillation of the rocking frame.

10. A hob grinder having a grinder spindle, a hob spindle, means for rotating the hob spindle, a lead nut, a lead screw in line and unitary with the hob spindle and forming a bearing for the hob spindle, the lead nut being split and the threads thereof and of the lead screw having sloping sides, and means for yieldingly pressing the parts of the lead nut together for obtaining a close running fit between them and the lead nut, and substantially eliminating end play of the hob spindle.

11. A hob grinder having a grinder, a hob spindle, driving means for rotating the spindle, a lead nut, a lead screw in line and unitary with the hob spindle and forming the bearing for the hob spindle on one side of the driving means, the threads of the lead nut and lead screw having sloping sides and the lead nut being formed in a plurality of parts and one of the parts having yielding means for pressing it toward another to maintain close contact with the threads of the lead screw, the lead nut forming the bearing for the hob spindle on one side of the driving means and there being an additional bearing for the hob spindle on the opposite side of the driving means.

12. In a hob grinder, the combination of a wide-face pinion, a bull gear meshing and sliding therewith, a spindle to which the bull gear is fastened, a bearing for the spindle on one side of the bull gear, said spindle being adapted to support the hob, a thread formed on the spindle on the opposite side of the bull gear and having sloping sides, a lead nut threaded to cooperate with the lead screw on the hob spindle and forming a bearing therefor, said nut being formed in a plurality of parts, a spring for pressing one of said parts toward the threaded portion of the spindle for maintaining close contact therewith and substantially eliminating endwise play of the spindle, a grinder, a support for the lead nut and the first mentioned bearing, which support is rockable about the axis of the pinion and means for rocking said bearings about the axis of the pinion to move the hob toward and from the grinder for producing relief in the hob teeth.

13. A hob grinder having a grinder, a hob spindle which is rotatable and axially movable, a gear wheel fastened to the hob spindle and traveling therewith, a wide-face pinion meshing with said gear for rotating it, a lead screw integral with the hob spindle for moving it axially, a plurality of bearings, one for the hob spindle and another for the lead screw, and means for producing relative bodily movement between the spindle and the grinder to produce relief in the hob teeth.

In witness whereof, I have hereunto subscribed my name.

CHARLES J. IRWIN.